United States Patent
Kishino et al.

[11] 3,821,246
[45] June 28, 1974

[54] O-ETHYL-S-ALKYL-S-PHTHALIMIDO-ALKYL-PHOSPHORODITHIOLATES

[75] Inventors: Shigeo Kishino, Tokyo; Akio Kudamatsu; Kozo Shiokawa, both of Kanagawa; Shinich Yamaguchi, Tokyo, all of Japan

[73] Assignee: Bayer Aktiengesellschaft, Leverkusen, Germany

[22] Filed: June 28, 1972

[21] Appl. No.: 266,955

[30] Foreign Application Priority Data
July 7, 1971  Japan.................................. 46-49589

[52] U.S. Cl. ............................. 260/326 E, 424/200
[51] Int. Cl.............................................. C07d 27/52
[58] Field of Search ................................ 260/326 E

[56] References Cited
UNITED STATES PATENTS
2,767,194  10/1956  Fancher............................. 260/326
3,658,840  4/1972  Oswald............................... 260/326

*Primary Examiner*—Joseph A. Narcavage
*Attorney, Agent, or Firm*—Burgess, Dinklage & Sprung

[57]  ABSTRACT

O-ethyl-S-alkyl-S-phthalimido-alkyl-phosphorodithiolates of the general formula

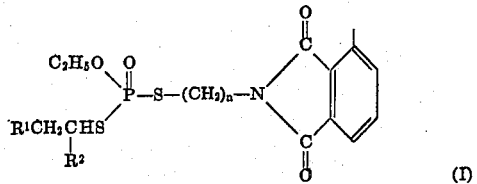

wherein
  $R^1$ is methyl or alkoxy of 1 to 6 carbon atoms,
  $R^2$ is hydrogen or methyl, and
  $n$ is 1 or 2, which possess insecticidal, acaricidal and nematocidal properties.

8 Claims, No Drawings

O-ETHYL-S-ALKYL-S-PHTHALIMIDO-ALKYL-PHOSPHORODITHIOLATES

The present invention relates to and has for its objects the provision of particular new O-ethyl-S-alkyl-S-phthalimido-alkyl-phosphorodithiolates, i.e., O-ethyl-S-n-propyl-,sec-butyl-,alkoxyethyl- or alkoxyisopropyl-S-phthalimidomethyl- or -ethyl-phosphorodithiolates which possess insecticidal, acaricidal and nematocidal properties, active compositions in the form of mixtures of such compounds with solid and liquid dispersible carrier vehicles, and methods for producing such compounds and for using such compounds in a new way especially for combating pests, e.g., insects, acarids, and nematodes, with other and further objects becoming apparent from a study of the within specification and accompanying examples.

Insecticides comprising certain phthalimido alkyl esters of organic phosphoric acids, such as those sold under the names "Imidan" (A) and "Torak" (B), are known:

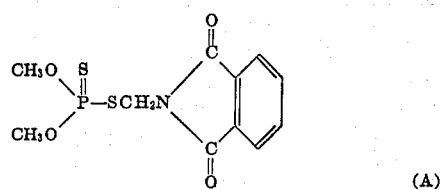

(A)

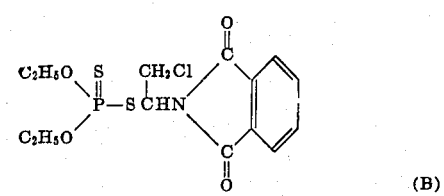

(B)

The present invention provides organic phosphoric acid esters of the following general formula:

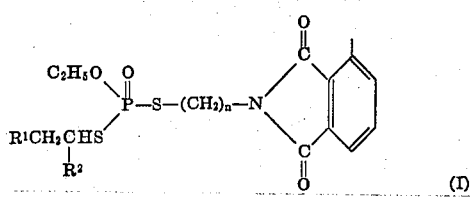

(I)

wherein
R$^1$ is methyl or alkoxy of 1 to 6 carbon atoms,
R$^2$ is hydrogen or methyl, and
n is 1 or 2, which compounds are phosphorodithiolates compared with the above-named prior art compounds which are phosphorodithioates, the new compounds having an excellent insecticidal activity comparing favorably with the known compounds.

Preferably R$^1$ is a methyl group or a lower alkoxy group such as methoxy, ethoxy, n-propoxy, iso-propoxy, n-butoxy, iso-butoxy, sec-butoxy or tert-butoxy.

The present invention also provides a process for the production of a compound of formula (I) in which (a) a dithiophosphoric acid salt of the general formula

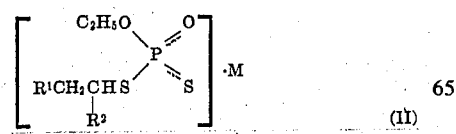

(II)

is reacted with a phthalimido alkyl halide of the general formula

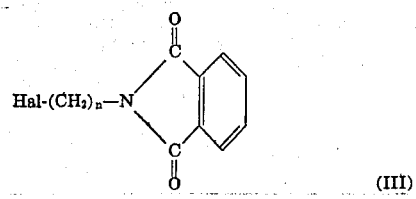

(III)

or (b) a dithiophosphoric acid salt of the general formula

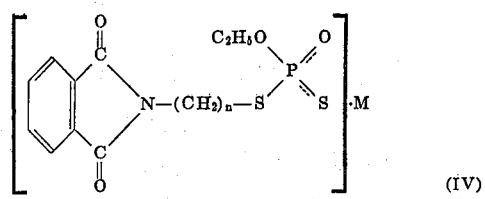

(IV)

is reacted with an alkyl or alkoxy alkyl halide of the general formula

(V)

wherein
R$^1$, R$^2$ and n have the meanings given above,
M is a metal or ammonium, and Hal is halogen.
Process variant (a) is illustrated by the following formula scheme:

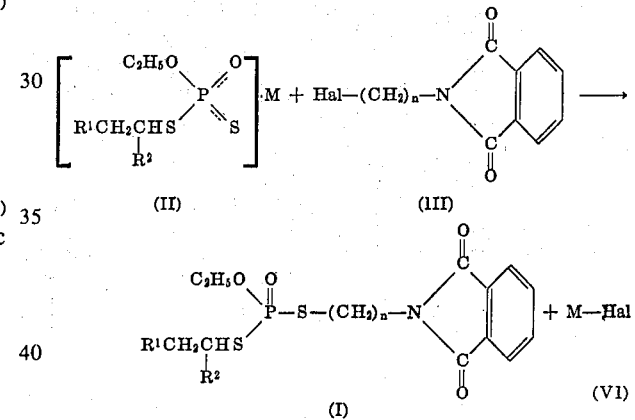

Examples of the dithiophosphoric acid salt of general formula (II) are potassium, sodium and ammonium salts of O-ethyl-S-n-propyl-, O-ethyl-S-sec-butyl-, O-ethyl-S-(β-ethoxyethyl)-, O-ethyl-S-(β-iso-propoxyethyl)- and O-ethyl-S-(β-n-butoxy-ethyl)dithiophosphoric acids.

Examples of the phthalimido alkyl halide of general formula (III) are phthalimido-methyl bromide, phthalimido-methyl chloride, 2-phthalimido-ethyl bromide and 2-phthalimido-ethyl chloride.

Process variant (b) is illustrated by the following reaction scheme:

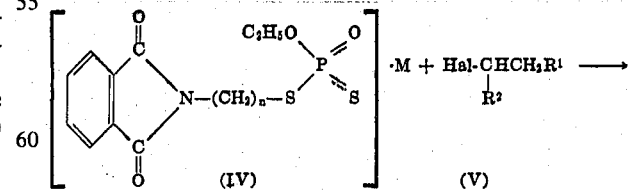

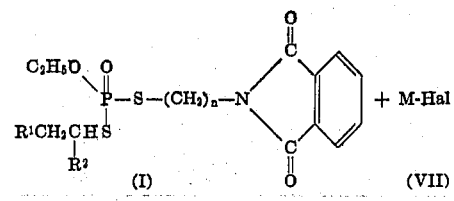

Examples of the dithiophosphoric acid salt of general formula (IV) are potassium, sodium and ammonium salts of O-ethyl-S-phthalimido-methyl-dithiophosphoric acid and O-ethyl-S-(2-phthalimido-ethyl)-dithiophosphoric acid.

Examples of the alkyl or alkoxy alkyl halide of general formula (V) are n-propyl bromide, n-propyl chloride, sec-butyl bromide, sec-butyl chloride, $\beta$-ethoxyethyl bromide, $\beta$-iso-propoxyethyl bromide, $\beta$-iso-propoxyethyl chloride, $\beta$-n-butoxyethyl bromide and $\beta$-n-butoxyethyl chloride.

In this invention it is preferred that the synthesis of the active compounds of this invention be conducted in a solvent or diluent. For this purpose any inert solvent or diluent may be used.

As examples of the solvent or diluent there may be cited water; aliphatic, alicyclic and aromatic hydrocarbons (which may be halogenated) such as hexane, cyclohexane, petroleum ether, ligroin, benzene, toluene, xylene, methylene chloride, chloroform, carbon tetrachloride, mono-, di- and tri-chloroethylenes, and chlorobenzene; ethers such as diethyl ether, methyl ethyl ether, iso-propyl ether, dibutyl ether, ethylene oxide, dioxane and tetrahydrofuran; ketones such as acetone, methyl ethyl ketone, methyl isobutyl ketone and methyl isopropyl ketone; nitriles such as acetonitrile, propionitrile and acrylonitrile; alcohols such as methanol, ethanol, isopropenol, butanol and ethylene glycol; esters such as ethyl acetate and amyl acetate; acid amides such as dimethyl formamide and dimethyl acetamide; and sulfoxides and sulfones such as dimethyl sulfoxide and sulfolane.

The above synthesis reaction may be conducted in the presence of an acid binder. For this purpose, there may be used customary acid binders such as hydroxides, carbonates, bicarbonates and alcoholates of alkali metals, and tertiary amines, for example triethylamine, diethylaniline and pyridine.

In the above process variants, the reaction may be effected at temperatures in a wide range, but generally the reaction is carried out at from about $-20°C$ to the boiling point of the reaction mixture, preferable temperatures being in the range of from about $0°$ to $100°C$.

It is preferable that the reaction be conducted under atmospheric pressure but it is possible to conduct the reaction under reduced or elevated pressures.

The active compounds of this invention exhibit an excellent biological activity against various harmful insects, nematodes and mites. These compounds have low toxicity to warm-blooded animals and are generally slightly or not at all phytotoxic in the applied amounts. Furthermore, they exhibit their effects quickly and their activity can be maintained for a long time. Accordingly, they can be used for controlling pests of a broad range such as sucking insects, biting insects, mites and nematodes.

For instance, the active compounds of this invention are effective for controlling harmful animals such as insects belonging to the Coleoptora, for example small rice weevil (*Sitophilus oryzae*), rust-red flour beetle (*Tribolium castaneum*), 28-spotted ladybug (*Epilachna vigintioctopunctata*), barley wireworm (*Musca fuscicollis*) and soybean beetle (*Anomala rufocuprea*), seed-corn belonging to the Lepidoptera, for example gypsy moth (*Lymantria dispar*), tent caterpillar (*Malacosoma neustria testacea*), common cabbage-worm (*Pieris rapae crucivora*), tobacco cutworm (*Prodenia litura*), rice stem borer (*Chilo suppressalis*), smaller tea tortrix (*Adoxophyes orana*) and almond moth (*Ephestia cautella*), insects belonging to the Hemiptera, for example green rice leafhopper (*Nephotettix cincticeps*), brown planthopper (*Nilaparvata lugens*), comstock mealybug (*Pseudococcus comstocki*), arrowhead scale (*Unaspis yanonensis*), green peach aphid (*Myzus persicae*), apple aphid (*Aphis pomi*) and cabbage aphid ($\beta$ revicoryne brassicae), insects belonging to the Orthoptera, for example German cockroach (*Blattella germanica*), American cockroach (*Periplaneta americana*) and African mole cricket (*Gryllotalpa africana*), insects belonging to the Isoptera, for example Japanese termite (*Ieucotermes speratus*), and insects belonging to the Diptera, for example house fly (*Musca domestica vicina*), yellow-fever mosquito (*Aedes aegypti*), seed-corn maggot (*Hylemia platura*), northern house mosquito (*Culex pipiens*), Chinese malaria mosquito (*Anopheles sinensis*) and smaller house mosquito (*Culex tritaeniorhynchus*); mites such as carmine mite (*Tetranychus telarius*), citrus red mite (*Panonychus citri*) and Japanese citrus rust mite (*Aculus pelekassi*); and nematodes such as southern root-knot nematode (*Meloidogyne incognita*), rice white-tip nematode (*Aphelenchides besseyi*) and soy bean cyst nematode (*Heterodera glycines*).

Still further, in the field of the veterinary medicine the novel compounds of this invention may be effectively used for controlling animal parasites (obligate parasites and ectoparasites) such as ticks, parasitic insects and helminths.

The active compounds according to the instant invention can be utilized, if desired, in the form of the usual formulations or compositions with conventional inert (i.e., plant compatible or herbicidally inert) pesticide diluents or extenders, i.e. diluents, carriers or extenders of the type usable in conventional pesticide formulations or compositions, e.g., conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g., benzene, toluene, xylene, alkyl naphthalenes, etc.), halogenated, especially chlorinated, aromatic hydrocarbons (e.g., chlorobenzenes, etc.), cycloalkanes (e.g., cyclohexane, etc.), paraffins (e.g., petroleum or mineral oil fractions), chlorinated aliphatic hydrocarbons (e.g., methylene chloride, ethylenechloride, etc.), alcohols (e.g., methanol, ethanol, propanol, butanol, glycol, etc.) as well as ethers and esters thereof (e.g., glycol monomethyl ether, etc.), amines (e.g., ethanolamine, etc.), amides (e.g., dimethyl formamide, etc.), sulfoxides (e.g., dimethyl sulfoxide, etc.), acetonitrile, ketones (e.g., acetone, methyl ethyl ketone, methyl isobutyl ketone, cyclohexanone, etc.), and/or water; as well as inert dispersible finely divided solid carriers, such as ground natural minerals (e.g., kaolins, clays, alumina, silica, chalk, i.e., calcium carbonate, talc, attapulgite, montmorillonite, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides and nematocides, or rodenticides, bactericides, herbicides, fertilizers, antivirus agents, growth-regulating agents (for instance, organic phosphoric acid esters, carbamate compounds, dithio or thiol carbamate compounds, organic chlorine compounds, dinitro compounds, organosulfur or organometallic compounds, antibiotic compounds, substituted diphenyl ethers, urea compounds and triazine compounds), etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.0001–20 percent, preferably 0.005–10 percent, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95 percent, and preferably 0.1–95 percent, by weight of the mixture.

The active compounds can also be used in accordance with the well known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 13 to 1000 g/hectare, preferably 30 to 600 g/hectare, are sufficient. In this process it is possible to use highly concentrated liquid compositions with said liquid carrier vehicles containing from about 20 to about 95 percent by weight of the active compound or even the 100 percent active substance alone, e.g. about 20–100 percent by weight of the active compound.

Furthermore, the present invention contemplates methods of selectively killing, combating or controlling pests, e.g., insects, acarids and nematodes, which comprises applying to at least one of correspondingly (a) such insects, (b) such acarids, (c) such nematodes, and (d) the corresponding habitat thereof, i.e. the locus to be protected, a correspondingly combative or toxic amount, i.e. an insecticidally, acaricidally or nematocidally effective amount of the particular active compound of the invention alone or together with a carrier vehicle as noted above. The instant formulations or compositions are applied in the usual manner such as spraying (for instance liquid spraying, liquid scattering, misting, atomizing, dust scattering, granule scattering, water surface-applying and pouring); fumigating; soil-applying (for instance mixing; sprinkling, vapor treatment and injecting); surface-application (for instance coating, banding, powder-coating and covering); dipping; and baiting.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

A mixture of 24 g of potassium O-ethyl-S-n-propyl-di-thiophosphate, 24 g of N-bromomethylphthalimide and 150 ml of ethyl alcohol was heated at 70°C. for 2 hours with agitation. The alcohol was removed by distillation under reduced pressure and benzene was added to the residue. The mixture was washed several times with water and 1% potassium carbonate, and dried over anhydrous sodium sulfate. Distillation of benzene gave 31 g of colorless oily O-ethyl-S-n-propyl-S-phthalimido-methyl-phosphorodithiolate characterized by a refractive index $n^{20}_D$ of 1.5886 and having the following formula:

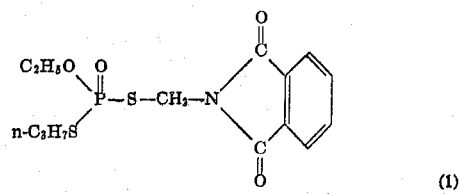

(1)

EXAMPLE 2

15 g of 2-ethoxyethyl bromide were added at room temperature to a mixture of 35 g of potassium O-ethyl-S-phthalimido-methyl-dithio-phosphate and 120 ml of acetonitrile. The mixture was gradually heated with agitation, and at 60°C the reaction was continued for 3 hours. After completion of the reaction, acetonitrile was removed by distillation under reduced pressure, and benzene was added to the residue. The mixture was washed with water and 1 percent potassium carbonate and dried over anhydrous sodium sulfate. Distillation of benzene gave 32 g of colorless oily O-ethyl-S-(β-ethoxy-ethyl)-S-phthalimido-methyl-phosphoro-dithiolate characterized by a refractive index $n^{20}{}_D$ of 1.-5730 and having the following formula:

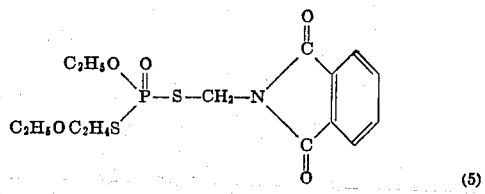

(5)

The above and other active compounds synthesized by similar methods are listed in Table 1.

TABLE 1

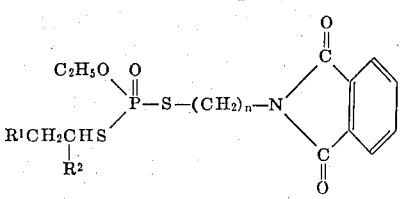

| Compound number | R¹ | R² | n | Physical constant |
|---|---|---|---|---|
| 1 | CH₃ | H | 1 | $n_D^{20}$ 1.5886 |
| 2 | CH₃ | H | 2 | $n_D^{20}$ 1.5762 |
| 3 | CH₃ | CH₃ | 1 | $n_D^{20}$ 1.5745 |
| 4 | CH₃ | CH₃ | 2 | $n_D^{20}$ 1.5669 |
| 5 | C₂H₅O— | H | 1 | $n_D^{20}$ 1.5730 |
| 6 | Iso-C₃H₇O— | H | 1 | $n_D^{20}$ 1.5633 |
| 7 | n-C₄H₉O— | H | 1 | $n_D^{20}$ 1.5580 |

EXAMPLE 3 (Wettable Powder)

15 parts of compound 1, 80 parts of a 1:5 mixture of diatomaceous earth and kaolin and 5 parts of an emulsifier ("RUNNOX", polyoxyethylene alkyl aryl ether) were ground and mixed together to form a wettable powder. It was diluted with water to a concentration of 0.05 percent and applied to harmful insects, mites and nematodes and/or places where harmful insects, mites and nematodes lived.

EXAMPLE 4 (Emulsifiable Liquor)

30 parts of compound 2, 30 parts of xylene, 30 parts of "KAWAKAZOL" (high boiling aromatic hydrocarbon), and 10 parts of an emulsifier "SORPOL" (polyoxyethylene alkyl aryl ether) were mixed with stirring to form an emulsifiable liquor. It was diluted with water to 0.05 percent and sprayed on harmful insects, mites and nematodes and/or places where harmful insects, mites and nematodes lived.

EXAMPLE 5 (Dust)

2 parts of compound 3 and 98 parts of a 1:3 mixture of talc and clay were ground and mixed together to form a dust. The dust was scattered on harmful insects, mites and nematodes and/or places where harmful insects, mites and nematodes lived.

EXAMPLE 6 (Dust)

1.5 parts of compound 5, 2 parts of an organic phosphoric acid ester, 0.5 part of iso-propyl hydrogen phosphate (PAP) and 96 parts of a 1:3 mixture of talc and clay were ground and mixed together to form a dust. The dust was scattered on harmful insects, mites and nematodes and/or places where harmful insects, mites and nematodes lived.

EXAMPLE 7 (Granule)

25 parts of water was added to a mixture of 10 parts of compound 4, 10 parts of bentonite, 78 parts of a 1:3 mixture of talc and clay and 2 parts of lignin sulfonate. The admixture was intimately blended and finely divided by means of an extruding granulator to obtain granules of 20 – 40 mesh, followed by drying at 40° – 50°C. The resulting granules were sprayed on harmful insects, mites and nematodes and/or places were harmful insects, mites and nematodes lived.

EXAMPLE 8 (Granule)

95 parts of clay particles of a size distribution of 0.2 – 2 mm were taken into a rotary mixer and a solution of 5 parts of compound 6 in an organic solvent was sprayed to the particles being rotated, thereby to wet the particles homogeneously. Then they were dried at 40° – 50°C. to form coated granules. They were sprayed on harmful insects, mites and nematodes and/or places where harmful insects, mites and nematodes lived.

EXAMPLE 9 (Oil Preparation)

0.5 part of compound 7, 20 parts of Velsicol AR-50 (high boiling aromatic hydrocarbon), and 79.5 parts of Deobase (deodorized kerosene) were mixed with stirring to form an oil preparation. It was sprayed on harmful insects, mites and nematodes and/or places where harmful insects, mites and nematodes lived.

EXAMPLE 10

Test on effects against tobacco cutworm larvae:
Preparation of Sample Chemicals:
Solvent: 3 parts by weight of xylene
Emulsifier: 1 part by weight of alkylaryl polyglycol ether In order to prepare a suitable formulation of an active compound, one part by weight of the active compound is mixed with the above amount of the solvent containing the above amount of the emulsifier, and the mixture is diluted with water to form an aqueous dilution containing the active compound at a prescribed concentration.

Test Procedures

Sweet potato leaves are dipped in a dilution of an emulsifiable liquor containing the compound of this invention at the prescribed concentration, and they are dried in air and placed in a 9 cm diameter Petri dish. Then 10 of third-instar tobacco cutworm (Prodenia litura) are put into the dish and the dish is kept in a thermostat chamber maintained at 28°C. After 24 hours have passed, the number of dead worms is counted and the killing ratio (percentage killed) is calculated. The results are shown in Tables 2 and 3.

EXAMPLE 11

Test on effects against diamondback moth:

Test procedures

Cabbage leaves are dipped in an aqueous dilution containing the active compound at the prescribed concentration and prepared in the same manner as in Example 10 After the chemical liquor has been air-dried, the leaves are put into a Petri dish of 9 cm diameter and 10 diamondback moth larvae are let free in the dish. The dish is thereafter kept in a thermostat chamber maintained at 28°C. After 24 hours have passed, the number of dead worms is counted and the killing ratio is calculated. The results are shown in Table 2.

EXAMPLE 12

Test on almond moth:
Test procedures

A wire gauze vessel of 7 cm diameter and 0.9 cm height is charged with 20 of almond moth mature larvae and the vessel is dipped for 10 seconds in an aqueous dilution of an emulsifiable liquor containing the active compound at the prescribed concentration and prepared in the same manner as in Example 10. Then the vessel is kept for 24 hours in a thermostat chamber. The number of dead worms is counted and the killing ratio is calculated. The results are shown in Table 2.

Table 2

Results of Comparative Tests on Effects against Variuos Harmful Insects

| cut worm | Killing Ratio (%) | | | | |
|---|---|---|---|---|---|
| | Tobacco | | Diamond-back moth | Almond moth | |
| | Active ingredient concentration | | Active ingredient concentration | Active ingredient concentration | |
| Compound | 0.03% | 0.003% | 0.03% | 0.03% | 0.003% |
| 1 | 100 | 15 | 100 | 100 | 10 |
| 5 | 100 | 30 | 100 | 100 | 15 |
| Imidan (A) | 15 | 0 | 35 | 10 | 0 |
| Torak (B) | 30 | 0 | 55 | 10 | 0 |
| Untreated control | 0 | | 0 | 0 | |

Notes:
Imidan (A): O,O-dimethyl-S-phthalimido-methyl-phosphorodithioate
Torak (B): O,O-diethyl-S-(2-chloro-1-phthalimido)ethyl-phosphorodithioate

TABLE 3.—RESULTS OF TESTS ON EFFECTS AGAINST TOBACCO CUTWORM

| | Killing ratio (percent) | | |
|---|---|---|---|
| Active ingredient concentration | 0.1% | 0.03% | 0.01% |
| Compound: | | | |
| 1 | 100 | 100 | 100 |
| 2 | 100 | 100 | 10 |
| 3 | 100 | 100 | 50 |
| 4 | 100 | 100 | 20 |
| 5 | 100 | 100 | 100 |
| 6 | 100 | 100 | 20 |
| 7 | 100 | 100 | 10 |
| C (comparison) | 20 | 0 | 0 |
| Dipterex (Commercially available comparison) | 100 | 60 | 0 |
| Untreated control | 0 | 0 | 0 |

NOTES:

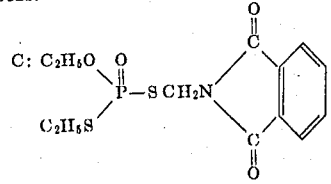

Dipterex: O,O-dimethyl-2,2,2-trichloro-1-hydroxyethyl phosphonate.

EXAMPLE 13

Test on durability of effects on tobacco cutworm larvae:
Test procedures

An aqueous dilution containing the active compound at a concentration of 0.05 percent and prepared in the same manner as in Example 10 is sprayed on cabbage seedlings planted in pots at an application rate of 20 ml per pot. The pots are kept in a greenhouse, and after the prescribed days have passed, cabbage leaves are cut off and put into a Petri dish of 9 cm diameter. Then 10 third-instar tobacco cutworm larvae are put into the dish, and after 24 hours have passed, the number of the dead worms is counted and the killing ratio is calculated.

The results are shown in Table 4.

Table 4

Results of Tests on Durability of Effects on Tobacco Cutworm Larvae

| Compound | Killing Ratio (%) | | | |
|---|---|---|---|---|
| | Days After Chemical Treatment | | | |
| | 1 day | 4 days | 7 days | 11 days |
| 1 | 100 | 100 | 100 | 95 |
| 2 | 100 | 100 | 20 | 0 |
| 5 | 100 | 100 | 100 | |
| Dipterex (commercially available comparison) | 100 | 0 | 0 | 0 |
| Untreated control | 0 | 0 | 0 | 0 |

EXAMPLE 14

Test of effects against carmine mites:
Test Procedure

A haricot bean having two developing leaves planted in a 6 cm diameter pot is infected with 50–100 carmine mite imagines and nymphs. Two days after the infection, an aqueous formulation containing the active compound at a prescribed concentration, which is prepared in the same manner as in Example 10 is sprayed in an amount of 40 ml per pot. The pot is kept in a greenhouse for 10 days, and the control effect is evaluated. The evaluation is expressed by an index on the following scale:

Index:
3: No living imago, nymph or egg
2: less than 5 percent of living imagines, nymphs and eggs based on the untreated control
1: 6 – 50 percent of living imagines, nymphs and eggs based on the untreated control
0: more than 50 percent of living imagines, nymphs and eggs based on the untreated control.

Table 5

Results of Tests on Effects against Carmine Mite

| Compound | Control effect index | |
|---|---|---|
| | Active ingredient concentration | |
| | 0.03% | 0.01% |
| 1 | 3 | 3 |
| 2 | 3 | 3 |
| 3 | 3 | 3 |
| 4 | 3 | 3 |
| 5 | 3 | 3 |
| 6 | 3 | 3 |
| 7 | 3 | 3 |

Table 5-Continued

Results of Tests on Effects against Carmine Mite

| Compound | Control effect index Active ingredient concentration | |
|---|---|---|
| | 0.03% | 0.01% |
| C (comparison) | 3 | 2 |
| Galecron (commercially available comparison) | 3 | 1 |

Note:
Galecron: N'-(2-methyl-4-chlorophenyl)-N,N-dimethyl formamizine hydrochloride

EXAMPLE 15

Test on effects against azuki bean weevils:
Test Procedure:
20 azuki bean weevils were soaked for 1 minute in an aqueous formulation containing an active compound at a prescribed concentration and which had been prepared in the same manner as in Example 10, and they were then kept in a thermostat chamber maintained at 28°C. The number of dead weevils was counted after 24 hours had passed and the killing ratio was calculated. The results are shown in Table 6.

Table 6

Results of Tests on Effects against Azuki Bean Weevil

| Compound | Killing Ratio (%) Active ingredient concentration | |
|---|---|---|
| | 0.1 % | 0.01 % |
| 3 | 100 | 100 |
| 4 | 100 | 100 |
| 6 | 100 | 80 |
| C (comparison) | 100 | 30 |
| Untreated control | 0 | |

EXAMPLE 16

Test on effects against root-knot nematodes:
Preparation of Sample Chemical
2 parts by weight of an active compound were mixed with 98 parts by weight of talc, and the mixture was ground to form a dust.
Test Procedure:
The formulation as prepared above was mixed with soil tainted with sweet-potato root-knot nematodes in an amount such that a prescribed concentration of the active compound was attained in the soil. The treated soil was stirred and mixed until uniform, and then it was packed into pots each having an area of 1/5000 are. Thereafter, about 20 tomato seeds (Kurihara variety) were sown per pot and cultivated for 4 weeks in a greenhouse. Then each tomato was drawn out from the soil without damaging roots. The infestation grade caused by the nematodes was evaluated with respect to 10 tomatoes as one group based on the following scale.

Knot Index
0 ... no knots (perfect control)
1 ... knots are formed lightly
2 ... knots are formed to a middling extent
3 ... knots are formed to a considerable extent
4 ... formation of knots is extreme The infestation grade is determined by the following equation:

Infestation grade = [Σ(rank value) × (rank population)/(whole population examined) × 4] × 100

The results are shown in Table 7.

Table 7

Results of Test on Effects against Root knot Nematode

| Compound | Active ingredient concentration(ppm) | Infestation grade (%) |
|---|---|---|
| 1 | 50 | 12.5 |
| 2 | 50 | 7.5 |
| 3 | 50 | 0 |
| 4 | 50 | 0 |
| C (comparison) | 50 | 78.8 |
| Untreated control | — | 80.2 |

It will be appreciated that the instant specification and examples are set forth by way of illustration and not limitation, and that various modifications and changes may be made without departing from the spirit and scope of the present invention.

What is claimed is:

1. A phosphorodithiolate of the formula:

$$\begin{array}{c} C_2H_5O \\ R^1CH_2CHS \\ | \\ R^2 \end{array} \!\!\!\! P(=O)\!-\!S\!-\!(CH_2)_n\!-\!N\!\!\!\!\begin{array}{c} CO \\ \diagup \\ \diagdown \\ CO \end{array}\!\!\!\!C_6H_4 \quad (I)$$

wherein
R$^1$ is methyl or alkoxy of 1 to 6 carbon atoms,
R$^2$ is hydrogen or methyl, and
n is 1 or 2.

2. The compound according to claim 1 wherein such compound is O-ethyl-S-n-propyl-S-phthalimido-methyl-phosphorodithiolate of the formula $$\begin{array}{c} C_2H_5O \\ n\text{-}C_3H_7S \end{array}\!\!\!\! P(=O)\!-\!S\!-\!CH_2\!-\!N\!\!\!\!\begin{array}{c} CO \\ \diagup \\ \diagdown \\ CO \end{array}\!\!\!\!C_6H_4 \quad (1)$$

3. The compound according to claim 1 wherein such compound is O-ethyl-S-n-propyl-S-(β-phthalimido-ethyl)-phosphorodithiolate of the formula $$\begin{array}{c} C_2H_5O \\ CH_3CH_2CH_2S \end{array}\!\!\!\! P(=O)\!-\!S\!-\!(CH_2)_2\!-\!N\!\!\!\!\begin{array}{c} CO \\ \diagup \\ \diagdown \\ CO \end{array}\!\!\!\!C_6H_4 \quad (2)$$

4. The compound according to claim 1 wherein such compound is O-ethyl-S-sec.butyl-S-phthalimido-methyl-phosphorodithiolate of the formula $$\begin{array}{c} C_2H_5O \\ CH_3CH_2CHS \\ | \\ CH_3 \end{array}\!\!\!\! P(=O)\!-\!S\!-\!CH_2\!-\!N\!\!\!\!\begin{array}{c} CO \\ \diagup \\ \diagdown \\ CO \end{array}\!\!\!\!C_6H_4 \quad (3)$$

5. The compound according to claim 1 wherein such compound is O-ethyl-S-sec.butyl-S-(β-phthalimido-ethyl)-phosphorodithiolate of the formula

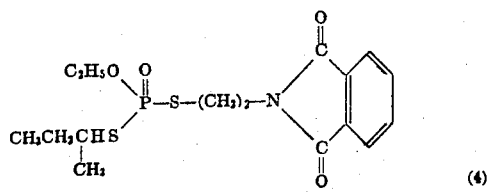

(4)

6. The compound according to claim 1 wherein such compound is O-ethyl-S-(β-ethoxy-ethyl)-S-phthalimido-methyl-phosphorodithiolate of the formula

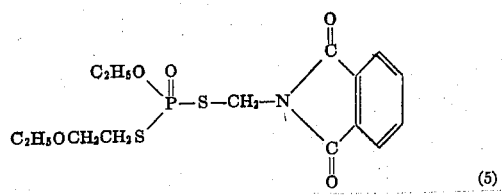

(5)

7. The compound according to claim 1 wherein such compound is O-ethyl-S-(β-isopropoxy-ethyl)-S-phthalimido-methyl-phosphorodithiolate of the formula

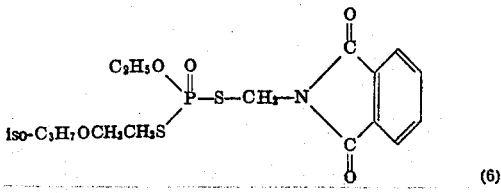

(6)

8. The compound according to claim 1 wherein such compound is O-ethyl-S-(β-n-butoxy-ethyl)-S-phthalimido-methyl-phosphorodithiolate of the formula

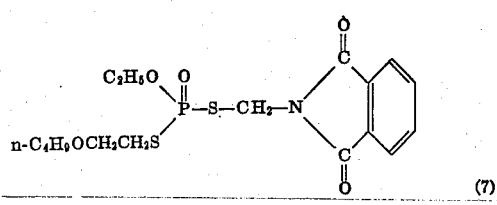

(7)

* * * * *

UNITED STATES PATENT OFFICE
CERTIFICATE OF CORRECTION

Patent No. 3,821,246  Dated June 28, 1974

Inventor(s) SHIGEO KISHINO ET AL

It is certified that error appears in the above-identified patent and that said Letters Patent are hereby corrected as shown below:

Col. 3, line 67, cancel "Musca" and substitute therefor

-- Agriotes --.

Col. 4, line 1, cancel "seed-corn" and substitute therefor

-- insects --.

Col. 9, line 33, Table 2, in the first column of the heading, cancel "cut worm" and in the second column under "Tobacco" insert -- cut worm --.

Signed and sealed this 8th day of October 1974.

(SEAL)
Attest:

McCOY M. GIBSON JR.
Attesting Officer

C. MARSHALL DANN
Commissioner of Patents